(12) United States Patent
Casillas et al.

(10) Patent No.: US 9,979,744 B1
(45) Date of Patent: *May 22, 2018

(54) DYNAMIC RISK ENGINE

(71) Applicant: United Services Automobile Association (USAA), San Antonio, TX (US)

(72) Inventors: Debra Casillas, Helotes, TX (US); Richard Andrew Davey, San Antonio, TX (US); Michael Frank Morris, San Antonio, TX (US); Maland Keith Mortensen, San Antonio, TX (US); John David Row, San Antonio, TX (US); Thomas Buckingham, Fair Oaks Ranch, TX (US); Tammy Sanclemente, Helotes, TX (US)

(73) Assignee: United States Automobile Association (USAA), San Antonio, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/953,607

(22) Filed: Nov. 30, 2015

Related U.S. Application Data

(63) Continuation of application No. 13/425,227, filed on Mar. 20, 2012, now Pat. No. 9,203,860.

(51) Int. Cl.
*G06F 7/04* (2006.01)
*H04L 29/06* (2006.01)

(52) U.S. Cl.
CPC ...... *H04L 63/1433* (2013.01); *H04L 63/0869* (2013.01)

(58) Field of Classification Search
CPC . H04L 63/08; H04L 63/1433; H04L 63/1416; G06F 21/577; G06F 21/6218
See application file for complete search history.

(56) References Cited

U.S. PATENT DOCUMENTS 6,252,869 B1 * 6/2001 Silverman ............... H04L 63/18
370/352
7,389,917 B2 6/2008 Abraham et al.
(Continued)

FOREIGN PATENT DOCUMENTS

WO    WO 2008061066    5/2008

OTHER PUBLICATIONS

Aho, Alfred V. et al., "Compilers: principles, techniques, and tools", Second Edition, 1038 pages, Pearson/Addison Wesley, 2007.
(Continued)

*Primary Examiner* — Ali Abyaneh
(74) *Attorney, Agent, or Firm* — Perkins Coie LLP

(57) ABSTRACT

Various embodiments of the present invention generally relate to identity authentication and/or recognition. Some embodiments provide a method for determining when a user may engage in a restricted activity, including engaging in an initial contact with a user via a medium for exchange, receiving a request to engage in an activity, determining an activity trust threshold required for the activity, determining an initial identity trust score for the user, and comparing the initial identity trust score with the activity trust threshold. Based on the comparison, the user is either allowed to engage in the activity, rejected from engaging in the activity, or additional identifying information is collected.

20 Claims, 6 Drawing Sheets

(56) References Cited

U.S. PATENT DOCUMENTS

| | | | | |
|---|---|---|---|---|
| 7,490,242 | B2* | 2/2009 | Torres | H04L 63/0815 380/281 |
| 7,908,645 | B2* | 3/2011 | Varghese | G06Q 20/341 715/773 |
| 8,239,677 | B2* | 8/2012 | Colson | G06F 21/34 705/51 |
| 8,296,564 | B2* | 10/2012 | Ureche | H04L 9/3247 713/168 |
| 8,584,219 | B1 | 11/2013 | Toole | |
| 2004/0006532 | A1 | 1/2004 | Lawrence et al. | |
| 2008/0155651 | A1* | 6/2008 | Wasmund | G06F 21/316 726/2 |
| 2009/0018904 | A1 | 1/2009 | Shipman et al. | |
| 2009/0199264 | A1* | 8/2009 | Lang | G06F 21/31 726/1 |
| 2009/0254971 | A1 | 10/2009 | Herz et al. | |
| 2011/0004921 | A1 | 1/2011 | Homer | |
| 2011/0016534 | A1* | 1/2011 | Jakobsson | G06F 21/316 726/28 |
| 2011/0231911 | A1* | 9/2011 | White | H04L 63/08 726/7 |
| 2012/0030047 | A1 | 2/2012 | Fuentes et al. | |
| 2012/0054057 | A1 | 3/2012 | O'Connell et al. | |
| 2012/0054646 | A1 | 3/2012 | Hoomani et al. | |
| 2012/0109802 | A1 | 5/2012 | Griffin | |
| 2012/0137367 | A1 | 5/2012 | Dupont | |
| 2013/0123007 | A1 | 5/2013 | Williams et al. | |
| 2013/0239191 | A1 | 9/2013 | Bostick et al. | |

OTHER PUBLICATIONS

Albrecht, Conan C. et al., "Conducting a Pro-Active Fraud Audit: A Case Study", Journal of Forensic Accounting, 2000, pp. 203-218, vol. II, R.T. Edwards, Inc.
Albrecht, Conan C. et al., "Strategic Fraud Detection: A Technology-Based Model", 2010, retrieved from http://www.business.umt.edu/Libraries/Seminar_Series/F04-Strategic_Fraud_Detection.sflb.ashx, 70 pages.
Anderson, Debra et al., "Detecting Unusual Program Behavior Using the Statistical Component of the Next-generation Intrusion Detection Expert System (NIDES)", SRI International Technical Report SRI-CSL-95-06, May 1995, 86 pages, Computer Science Laboratory.
Anderson, Debra et al., "Next Generation Intrusion Detection Expert System (NIDES), Software Users Manual, Beta-Update Release", SRI International Technical Report SRI-CSL-95-0, Dec. 1, 1994, 316 pages, Computer Science Laboratory, Menlo Park, CA.
Bell, Timothy B. et al., "A Decision Aid for Assessing the Likelihood of Fraudulent Financial Reporting", Auditing: A Journal of Practice & Theory, Spring 2000, pp. 68-84, vol. 19, No. 1.
Berry, Michael et al., "Data Mining Techniques: Theory and Practice", 2009, ISBN 978-1-60764-366-1, SAS Institute.
Boatsman, James R. et al., "The Effects of Decision Consequences on Auditors' Reliance on Decision Aids in Audit Planning", Organizational Behavior and Human Decision Processes, Aug. 1997, pp. 211-247, vol. 71, No. 2, Academic Press.
Bolton, Richard J. et al., "Statistical Fraud Detection: A Review", Statistical Science, 2002, pp. 235-255, vol. 17, No. 3.
Bonifacio Jr., J. M. et al., "An Adaptive Intrusion Detection System Using Neural Networks", Proceedings of the 14th International Information Security Conference (IFIP/Sec'98, part of the 15th IFIP World Computer Congress), Aug. 31-Sep. 4, 1998, pp. 276-280, ISBN: 3-85403-116-5, IFIP, Austrian Computer Society, Vienna, Austria and Budapest, Hungary.
Brause, R. et al., "Neural Data Mining for Credit Card Fraud Detection", In Tools with Artificial Intelligence, Proceedings of the 11th IEEE International Conference, 1999, pp. 103-106, IEEE.
Breunig, Markus M. et al., "LOF: Identifying Density-Based Local Outliers", Proceedings of the ACM SIGMOD International Conference on Management of Data, 2000, pp. 93-104, Dallas, TX.
Bridges, Susan M. et al., "Fuzzy Data Mining and Genetic Algorithms Applied to Intrusion Detection", Proceedings of the National Information Systems Security Conference (NISSC), Oct. 16-19, 2000, pp. 13-31, Baltimore, MD.
Burge, Peter et al., "An Unsupervised Neural Network Approach to Profiling the Behavior of Mobile Phone Users for Use in Fraud Detection", Journal of Parallel and Distributed Computing, May 10, 2001, pp. 915-925, vol. 61, Academic Press.
Casella, George et al., "Statistical Inference—Second Edition", 2001, 2 pages, ISBN: 0-534-24312-6, Duxbury, Pacific Grove, CA.
Chou, Youn-Min et al., "Power Comparisons for a Hotelling's $T^2$ Statistic", Communications in Statistics—Simulation and Computation, 1999, pp. 1031-1050, vol. 28, No. 4.
Cortes, Corinna et al., "Signature-Based Methods for Data Streams", Data Mining and Knowledge Discovery, 2001, pp. 167-182, vol. 5, Kluwer Academic Publishers, The Netherlands.
Cox, Kenneth C. et al., "Visual Data Mining: Recognizing Telephone Calling Fraud", Data Mining and Knowledge Discovery, Apr. 17, 1997, pp. 225-231.
Dasgupta, Dipankar et al., "An Immunity-Based Technique to Characterize Intrusions in Computer Networks", IEEE Transactions on Evolutionary Computation, Jun. 2002, pp. 281-291, vol. 6, No. 3, IEEE.
Debar, Herve et al., "A Neural Network Component for an Intrusion Detection System", IEEE Symposium on Research in Computer Security and Privacy, 1992, pp. 240-250, IEEE.
Decker, Paul, "Data's Mining Hidden Dangers", Banking Strategies, Mar./Apr. 1998, pp. 6-14.
Denning, Dorothy E., "An Intrusion-Detection Model", IEEE Transactions on Software Engineering, Feb. 1987, pp. 222-232, vol. SE-13, No. 2.
Dickerson, John E. et al., "Fuzzy Network Profiling for Intrusion Detection", Proceedings of the 19th International Conference of the North American Fuzzy Information Processing Society (NAFIPS), 2000, pp. 301-306.
Dokas, Paul et al., "Data Mining for Network Intrusion Detection", Proceedings of the NSF Workshop on Next Generation Data Mining, Nov. 2002, pp. 21-30.
Estevez, Pablo A. et al., "Subscription fraud prevention in telecommunications using fuzzy rules and neural networks", Expert Systems with Applications, 2006, pp. 337-344, vol. 31, Elsevier Ltd.
Estevez-Tapiador, Juan M. et al., "Anomaly detection methods in wired networks: a survey and taxonomy", Computer Communications, 2004, pp. 1569-1584, vol. 27, Elsevier B.V.
Estevez-Tapiador, Juan M. et al., "Detection of Web-based Attacks through Markovian Protocol Parsing", Proceedings of the 10th IEEE Symposium on Computers and Communications (ISCC 2005), 2005, pp. 457-462, IEEE.
Estevez-Tapiador, Juan M. et al., "Stochastic Protocol Modeling for Anomaly-Based Network Intrusion Detection", Proceedings of the 2003 IEEE International Workshop on Information Assurance, Mar. 24, 2003, pp. 3-12, ISBN 0-7695-1886-9, IEEE Press.
Everitt, Brian S., "A Monte Carlo Investigation of the Robustness of Hotelling's One- and Two-Sample $T^2$ Tests", Journal of the American Statistical Association, Mar. 1979, pp. 48-51, vol. 74, No. 365, American Statistical Association.
Ezawa, Kazuo J. et al., "Learning Goal Oriented Bayesian Networks for Telecommunications Risk Management", Proceedings of the 13th International Conference on Machine Learning, 1996, pp. 139-147, Morgan Kaufmann.
Fox, Kevin L. et al., "A Neural Network Approach Towards Intrusion Detection", 13th National Computer Security Conference, Oct. 1-4, 1990, pp. 125-134, Washington, D.C.
Frank, R.J. et al., "Time Series Prediction and Neural Networks", Journal of Intelligent & Robotic Systems, 2001, pp. 91-103, vol. 31, No. 1.
Garcia-Teodoro, P. et al., "Anomaly-based network intrusion detection: Techniques, systems and challenges", Computers & Security, 2009, pp. 18-28, vol. 28, Elsevier Ltd.
Green, Brian Patrick et al., "Assessing the Risk of Management Fraud Through Neural Network Technology", Auditing: A Journal of Practice & Theory, Spring 1997, pp. 14-28, vol. 16, No. 1.

(56) References Cited

OTHER PUBLICATIONS

Heckerman, David, "A Tutorial on Learning With Bayesian Networks", Technical Report MSR-TR-95-06, Nov. 1996, 58 pages, Microsoft Research, Redmond, WA.
Huang, Ling et al., "Adversarial Machine Learning", Proceedings of the 4th ACM Workshop on Security and Artificial Intelligence, Oct. 21, 2011, pp. 43-58, ACM, Chicago, IL.
Jiang, Cheng-Huang et al., "Keystroke Statistical Learning Model for Web Authentication", ASIACCS '07 Proceedings of the 2nd ACM Symposium on Information, Computer and Communications Security, Mar. 20-22, 2007, pp. 359-361, ACM, Singapore.
Khattree, Ravindra et al., "Multivariate Data Reduction and Discrimination with SAS © Software", 2000, SAS Institute.
Knapp, Carol A. et al., "The effects of experience and explicit fraud risk assessment in detecting fraud with analytical procedures", Accounting, Organizations and Society, 2001, pp. 25-37, vol. 26, Elsevier Science Ltd.
Kruegel, Christopher et al., "Bayesian Event Classification for Intrusion Detection", Proceedings of the 19th Annual Computer Security Applications Conference, 2003, 10 pages.
Lazarevic, Aleksandar et al., "Intrusion Detection: A Survey", Managing Cyber Threats: Issues, Approaches, and Challenges, 2005, 60 pages, Springer Verlag.
Lee, Wenke et al., "Real Time Data Mining-based Intrusion Detection", DARPA Information Survivability Conference & Exposition II, Proceedings of DISCEX'01, 2001, pp. 89-100, vol. 1, IEEE.
Li, Wei, "Using Genetic Algorithm for Network Intrusion Detection", 2004, pp. 1-8, C.S.G. Department of Energy.
Liao, Yihua et al., "Using K-Nearest Neighbor Classifier for Intrusion Detection", Computers & Security, 2002, pp. 439-448, vol. 21.
Lin, Jerry W. et al., "A fuzzy neural network for assessing the risk of fraudulent financial reporting", Managerial Auditing Journal, 2003, pp. 657-665, vol. 18, No. 8, MCB UP Limited.
Litan, Avivah, "Magic Quadrant for Web Fraud Detection", Apr. 19, 2011, 37 pages, Gartner, Inc., ID No. G00212116.
Lunt, Teresa F. et al., "A Real-Time Intrusion-Detection Expert System (IDES)", SRI International Final Technical Report, Feb. 28, 1992, 166 pages, Menlo Park, CA.
Mackay, David J.C., "Information Theory, Inference, and Learning Algorithms", 2003, 640 pages, ISBN 0-521-64298-1, Cambridge University Press.
Maes, Sam et al., "Credit Card Fraud Detection Using Bayesian and Neural Networks", American Association of Neurological Surgeons, 1993, pp. 261-270.
Mahoney, Matthew V. et al., "An Analysis of the 1999 DARPA/Lincoln Laboratory Evaluation Data for Network Anomaly Detection", Technical Report CS-2003-02, 2003, 20 pages, Florida Institute of Technology, Melbourne, FL.
Major, John A. et al., "EFD: A Hybrid Knowledge/Statistical-Based System for the Detection of Fraud", International Journal of Intelligent Systems, 1992, pp. 687-703, vol. 26, John Wiley & Sons, Inc.
Mason, R. L. et al., "Decomposition of $T^2$ for Multivariate Control Chart Interpretation", Journal of Quality Technology, 1995, pp. 99-108, vol. 27, No. 2.
Mason, Robert L. et al., "A Practical Approach for Interpreting Multivariate $T^2$ Control Chart Signals", Journal of Quality Technology, Oct. 1997, pp. 396-406, vol. 29, No. 4.
Mason, Robert L. et al., "Assessment of Multivariate Process Control Techniques", Journal of Quality Technology, Apr. 1997, pp. 140-143, vol. 29, No. 2.
Mason, Robert L. et al., "Improving the Sensitivity of the $T^2$ Statistic in Multivariate Process Control", Journal of Quality Technology, Apr. 1999, pp. 155-164, vol. 31, No. 2.
Nieschwietz, Robert J. et al., "Empirical Research on External Auditors' Detection of Financial Statement Fraud", Journal of Accounting Literature, 2000, pp. 190-246, vol. 19.
Nigrini, Mark J., "Forensic Analytics: Methods and Techniques for Forensic Accounting Investigations", 2011, ISBN 978-0-470-89046-2, John Wiley & Sons, Inc., Hoboken, NJ.
Pak, Alexander et al., "Twitter as a Corpus for Sentiment Analysis and Opinion Mining", Proceedings of LREC, May 2010, 7 pages.
Palshikar, Girish Keshav, "The Hidden Truth", Intelligent Enterprise, May 28, 2002, pp. 46-51, vol. 5, No. 9.
Patcha, Animesh et al., "An Overview of Anomaly Detection Techniques: Existing Solutions and Latest Technological Trends", Computer Networks, 2007, pp. 3448-3470, vol. 51, No. 12, DOI: 10.1016/j.comnet.2007.02.001.
Phua, Clifton et al., "A Comprehensive Survey of Data Mining-based Fraud Detection Research", 2005, Clayton School of Information Technology, Monash University, Clayton, Victoria, Australia, 14 pages.
Porras, Phillip A. et al., "EMERALD: Event Monitoring Enabling Responses to Anomalous Live Disturbances", 20th NIST-NCSC National Information Systems Security Conference, 1997, pp. 353-365, Baltimore, MD.
Portnoy, Leonid et al., "Intrusion Detection with Unlabeled Data Using Clustering", Proceedings of the ACM Workshop on Data Mining Applied to Security, 2001, 14 pages.
Sekar, R. et al., "Specification-based Anomaly Detection: A New Approach for Detecting Network Intrusions", Proceedings of the Ninth ACM Conference on Computer and Communications Security (CCS '02), Nov. 18-22, 2002, pp. 265-274, ACM, Washington, D.C.
Sequeira, Karlton David, "Anomaly-Based Data Mining of Intrusions", Proceedings of the 8th ACM SIGKDD International Conference on Knowledge Discovery and Data Mining, 2002, pp. 386-395.
Shelton, Sandra Waller et al., "Auditing Firms' Fraud Risk Assessment Practices", Accounting Horizons, Mar. 2001, pp. 19-33, vol. 15, No. 1, American Accouting Association.
Smaha, Stephen E., "Haystack: An Intrusion Detection System", Aerospace Computer Security Applications Fourth Conference, 1988, pp. 37-44, IEEE.
Stolfo, Salvatore J. et al., "Cost-based Modeling for Fraud and Intrusion Detection: Results from the JAM Project", DARPA Information Survivability Conference and Exposition, Proceedings of DISCEX'00, 2000, pp. 130-144, vol. 2, IEEE.
Tombini, Elvis et al., "A Serial Combination of Anomaly and Misuse IDSes Applied to HTTP Traffic", 20th Annual Computer Security Applications Conference, 2004, Tucson, AZ, 10 pages.
Viaene, Stijn et al., "A Comparison of State-of-the-Art Classification Techniques for Expert Automobile Insurance Claim Fraud Detection", The Journal of Risk and Insurance, 2002, pp. 373-421, vol. 69, No. 3.
Vigna, Giovanni et al., "The STAT Tool Suite", DARPA Information Survivability Conference and Exposition, Proceedings of DISCEX'00, 2000, pp. 46-55, vol. 2, IEEE.
Ye, Nong et al., "Multivariate Statistical Analysis of Audit Trails for Host-Based Intrusion Detection", IEEE Transactions on Computers, Jul. 2002, pp. 810-820, vol. 51, No. 7.
Ye, Nong et al., "Robustness of the Markov-Chain Model for Cyber-Attack Detection", IEEE Transactions on Reliability, Mar. 2004, pp. 116-123, vol. 53, No. 1, IEEE.
Yeung, Dit-Yan et al., "Host-Based Intrusion Detection Using Dynamic and Static Behavioral Models", Pattern Recognition, 2003, pp. 229-243, vol. 36, No. 1.
Zhang, Jiong et al., "A Hybrid Network Intrusion Detection Technique Using Random Forests", Proceedings of the First International Conference on Availability, Reliability and Security (ARES'06), 2006, pp. 262-269, IEEE.
Barbacci, Mario et al., "Quality Attributes", CMU/SEI Technical Report, Dec. 1995, referenced online at http://www.sei.cmu.edu/pub/documents/95.reports/pdf/tr021.95.pdf, 68 pages.
Murad, Uzi et al., "Unsupervised Profiling for Identifying Superimposed Fraud", Principles of Data Mining and Knowledge Discovery, Proceedings of Third European Conference, PKDD'99, 1999, pp. 264-274, Springer-Verlag, Berlin Heidelberg.
Ramadas, Manikantan et al., "Detecting Anomalous Network Traffic with Self-organizing Maps", Recent Advances in Intrusion Detection, Proceedings of 6th International Symposium, RAID 2003, 2003, pp. 45-63, Springer-Verlag, Berlin Heidelberg.

(56) References Cited

OTHER PUBLICATIONS

U.S. Appl. No. 13/425,227, filed Mar. 20, 2012, Dynamic Risk Engine.
U.S. Appl. No. 61/704,180, filed Sep. 21, 2012, Dynamic Risk Engine.
U.S. Appl. No. 61/814,636, filed Apr. 22, 2013, Dynamic Risk Engine.
U.S. Appl. No. 13/801,784, filed Mar. 13, 2013, Behavioral Profiling Method and System to Authenticate a User.
U.S. Appl. No. 14/034,100, filed Sep. 23, 2013, Scalable Risk-Based Authentication Methods and Systems.

* cited by examiner

DYNAMIC RISK ENGINE

CROSS REFERENCE TO RELATED APPLICATION

This application is a continuation of U.S. Patent Application No. 13/425,227 entitled "Dynamic Risk Engine," filed Mar. 20, 2012, which is hereby incorporated by reference in its entirety for all purposes.

TECHNICAL FIELD

Various embodiments of the present invention generally relate to identity authentication. More specifically, various embodiments of the present invention relate to a dynamic risk engine for determining when and whether sufficient identifying information is available to permit a user to engage in a restricted activity.

BACKGROUND

Organizations strive to ensure secure and convenient user access to services or accounts. With the proliferation of identity theft and the growing emphasis on convenience, organizations are forced to find a balance between gathering enough identifying information and making the services or accounts accessible to users. Regulations and business rules may govern how much or what identifying information the user must provide depending upon the nature of the activity that is requested.

Existing systems often sacrifice security for convenience. For example, users may be required to provide a login, password, and answer a secret question simply to view current interest rates. Thus, although the user may be engaging in a low-risk activity, the user may be required to provide an excessive amount of information. Additionally, the risk level of an activity may vary with the user, depending on past behaviors or account preferences.

Further complicating the balance between security and convenience is that organizations have various channels in which users may interact with the organization. For example, users may perform activities related to an account at the organization over the phone, through an internet portal, by mobile phone application, or by face to face contact at a brick and mortar building. Thus, with the different means of interaction and access, organizations must provide various methods of verifying the user's identity.

This creates a need for a flexible way to verify user identity that provides a sufficient level of both security and convenience. Therefore, this disclosure describes a dynamic risk engine for determining when there is sufficient identifying information for a user to engage in a restricted activity and to facilitate equitable comparisons of trust across multiple users, computing devices, and/or channels.

SUMMARY

Methods and systems for determining when a user may engage in a restricted activity are provided. Some embodiments include engaging in an initial contact with a user via a channel, acquiring identifying information relating to the user, receiving, from the user, a request to engage in an activity, determining an activity trust threshold required for the activity, determining an initial identity trust score for the user based on the identifying information, comparing the initial identity trust score with the activity trust threshold. Based on the comparison, the user is either allowed to engage in the activity, rejected from engaging in the activity, or additional identifying information is collected.

In some embodiment, the identifying information includes at least one of information known to the user, a physical attribute of the user, or information identifying a device, wherein the device is associated with the user. In some embodiments, the identifying information includes one or more of: username, password, biometric data, device identification, automatic number identification, token, one time password, or grid card code. In some embodiments, identifying information includes historical user behavior. Historical user behavior may include information related to logon attempts and information related to prior activities performed by the user. Acquiring the identifying information relating to the user may include acquiring information based at least in part on the channel. In some embodiments, acquiring identifying information includes identifying, from a database, security preferences associated with the user. In some embodiments, the channel is an internet portal, face to face contact, mobile application, instant message system, or voice communication. Information in connection with the channel may include location information, device identification, past channel usage, language, network, or internet service provider.

In some embodiments, determining the activity trust threshold required for the activity comprises generating the activity trust threshold based on rules relating to a risk of the activity and information collected in connection with the channel. The risk of the activity may be determined by the type of activity, perceived threats, regulations, transaction amounts, and/or destination of funds. The risk of the activity may be affected by information provided by a third party.

In some embodiments the activity is performed during a session, a session being a continuous dialogue with the user. In some embodiments, the activity is initially performed via first channel during a session with the user, and later, the session is continued via a second channel, where the first and second channels are different channels.

In some embodiments, the user is allowed to engage in the activity only if the identity trust score meets or exceeds the activity trust threshold. In some embodiments, additional information is collected until a revised identity trust score meets or exceeds the activity trust threshold only if the identity trust score is below the activity trust threshold. In some embodiments, a user might be contacted on a new channel in order to raise the user's identity trust score. In some embodiments, a user is rejected from engaging in the activity only if the additional identifying information cannot raise the identity trust score above the activity trust threshold. In some embodiments, rejecting the request to engage in the activity comprises associated a fraud alert with the user.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
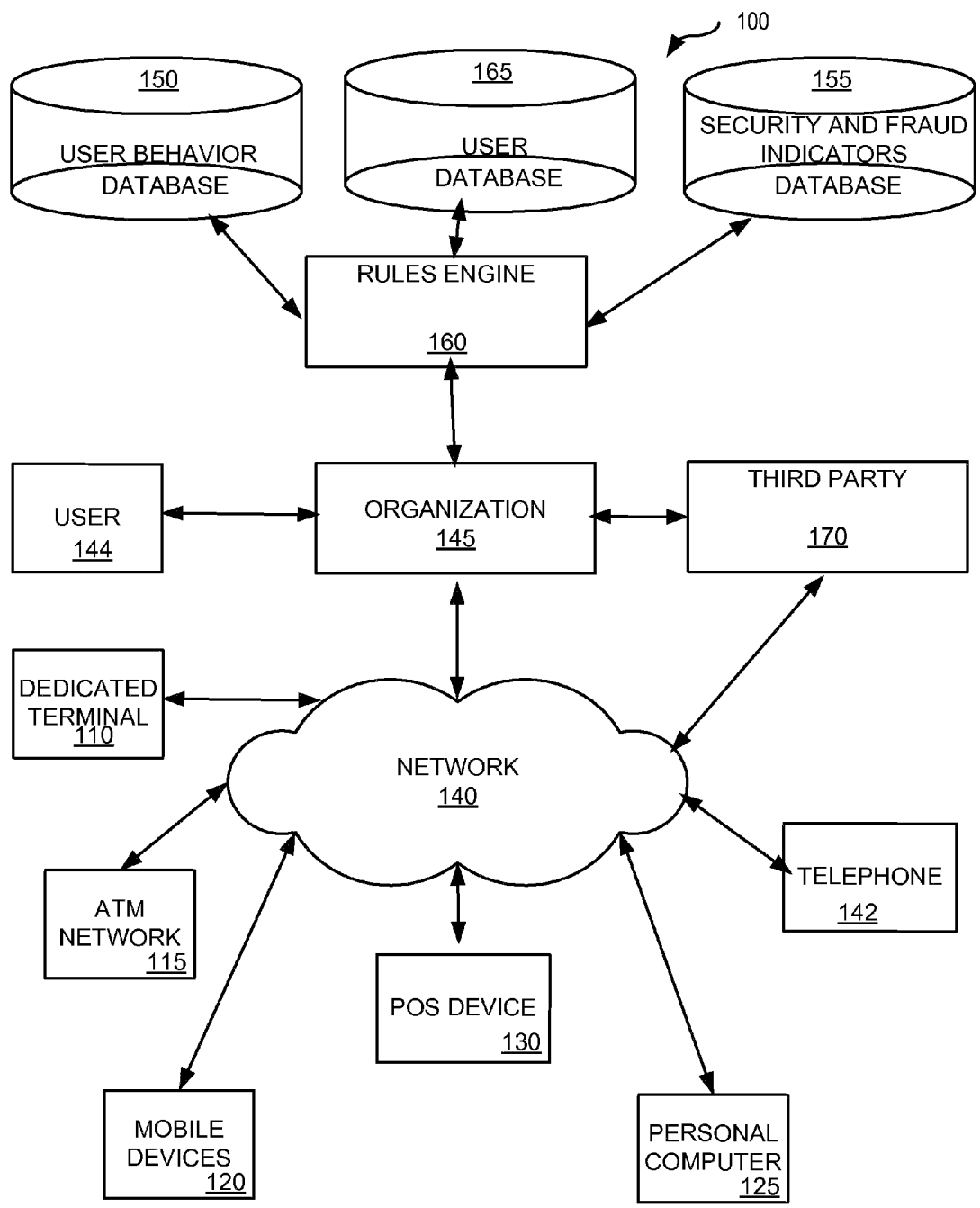
FIG. 1 illustrates an example of an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to identity authentication. More specifically, various embodiments of the present invention relate to a dynamic risk engine for determining when and whether sufficient identifying information is available to permit a user to engage in a restricted activity in addition to an authentication engine that is able to initiate channel-appropriate authentication challenges, in order to increase the identity trust score of a particular session. Existing and future authentication methods or mechanisms may be added, enabled, disabled, or removed from the authentication engine in a manner that does not disrupt or affect the integrity of the dynamic risk engine (i.e., authentication mechanisms are "hot-pluggable."). Organizations allow users to access services and engage in activities through various channels. Services may include automobile insurance, banking services, health insurance for example, and thus activities may include purchasing insurance, viewing premiums, making account transfers, paying bills, and investing money, for example. The various channels may include face to face contact (video telephones, Skype™, etc.), internet portals, mobile applications, voice communication, instant messaging systems, for example, and each channel may accept unique verifying information. Thus, users may access such accounts and perform various activities relating to the services via the channels when sufficient verifying information has been acquired. For each activity the user requests to engage in, the user is re-authenticated using the dynamic risk engine.

In order to engage in the activity, the user must provide a level of identifying information. The level of identifying information required is determined by an "activity trust threshold." Various rules and factors such as industry standards and fraud information on a particular activity are used in determining the activity trust threshold. The user's identity must be verified according to the activity trust threshold to engage in the activity.

An "identity trust score" is established for the user. During each user contact, identity characteristics and attributes about the user and his/her device will be collected. The characteristics and attributes collected during contact with a user are stored for future comparison and data modeling. Characteristics or attributes of the user will be assigned a score or level whether individually or grouped characteristics or attributes. When a user attempts to conduct an activity, the identity characteristics or attributes associated with the communication are compared to the known characteristics or attributes stored about the user. All the matched characteristics or attributes scores or levels are summed to total the identity trust score. Incorrect responses, uncharacteristic behavior, or intelligence about specific attributes that apply to a user will either increase the "activity trust threshold" or decrease the user's "identity trust score". The identity trust score is a measure of the identifying information that is acquired. The identity trust score may be determined by various rules. Identifying information may be information known to the user (e.g., password), a physical attribute of the user (e.g., biometric data), or information identifying a device, wherein the device is associated with the user (e.g., device fingerprint, phone number). Examples of identifying information may include a machine identification, username, password, social security number, token, personal identification number, grid card code, biometric data, or historic user behavior for example.

Various channels allow for various types of identifying information to be acquired. The measure may be numbers or levels, but in either case, the measure corresponds to the activity trust threshold such that the activity trust threshold and the identity trust score can be compared in a meaningful way. In various embodiments, the identity trust score must meet or exceed the activity trust threshold in order for the user to proceed with the activity. If the initial identifying information does not provide an identity trust score that meets or exceeds the activity trust threshold, the user may provide—or the system may acquire—additional identifying information to raise the identity trust score to meet or exceed the activity trust threshold. There may be an initial learning period on each channel such that initially, a user may have to use predefined authentication methods.

For example, a user is requesting to view an account (the activity) via an internet portal (the channel). The risk of the activity and the information collected in connection with the channel are used to determine an activity trust threshold equal to 50 for example. The machine used in connection with the channel is identified as registered, providing an identity trust score equal to 30. Thus, additional identifying information is necessary for the user to view the account. Identifying information such as a correct username and password may provide an identity trust score of 65, and, thus, if provided, the user will be permitted to view the account. If the user cannot provide this information, the user may provide other identifying information and still view the account if the other identifying information satisfies the activity trust threshold. In some examples, the user's behavior impacts the identity trust score. For example, if the user exhibits the same behaviors as the user has done in the past, the identity trust score may be recalculated to reflect this identifying information. In another example, a user wishing to engage in the activity of transferring money from one bank account to another bank account via a mobile application may satisfy the activity trust threshold simply by typing a personal identification number into the application on a certain device. For each activity requested, the user is re-authenticated using the process.

Thus the disclosure describes a dynamic risk engine that determines whether a user will be allowed to engage in an activity based on an activity trust threshold determined for that user and that activity, and comparing the activity trust threshold to an identity trust score calculated for the user. The identity trust score may be dynamically generated as identifying information becomes available. The identity trust score may increase or decrease depending on the identifying information.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Having described embodiments of the invention generally, attention is now directed to FIG. 1, which illustrates an example of an operating environment 100 in which some embodiments of the present invention may be utilized. The embodiments of the present invention illustrated in FIG. 1 allow user interactions with organization 145 through various points of interaction such as, but not limited to, dedicated terminals 110 (e.g., public terminal or kiosk), ATM networks 115 (e.g., interbank ATM network and intrabank ATM networks), mobile devices 120 (e.g., mobile phone), personal computers 125, point of sale (POS) devices 130, face to face contact represented by user 144, or by a landline telephone represented by telephone 142. These points of interaction can include mechanisms for engaging in activities with organization 145. For example, a user may engage in activities such as viewing an account, trading funds, purchasing insurance, submitting or processing a negotiable instrument and may run one or more applications or clients that allow a user to interact with the network. Such applications may provide access to the organization 145 processing systems and interfaces. Thus, the points of interaction allow the user to engage in an activity via a channel. The channels may include face to face contact as shown by user 141, voice communication such as through telephone 142, internet portal or instant messaging such as through personal computer 125, or mobile application such as through mobile device 120.

Dedicated terminals 110 such as public terminals/kiosks may be computers available to the public and/or specially designed kiosks that interact with network 140. ATM networks 115 can be any set of ATMs in an interbank ATM network and/or intrabank ATM network. Mobile devices 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/b/g connection or mobile broadband connection, such as via a 3G or 4G wireless network). Personal computers 125 may be any computer (e.g., desktop computers, laptop computers, netbooks, tablet computers, Internet-enabled television devices, etc.) connected to network 140. Dedicated terminals 110, mobile devices 120, and personal computer 125 may be capable of exchanging communication in the form of voice and/or video.

POS devices 130 can be any device used as a checkout or payment receiving mechanism for a merchant or service provider such as a hospital, ambulance company, doctor, automobile repair shop, pharmacy, clothing store, and others. For example, POS device 130 can be a terminal located at a merchant, a computer-based interface such as a webpage or custom application, a telephone payment system, and others.

Network 140 may include a banking network. In accordance with embodiments of the present invention, network 140 can use a variety of interaction methods, protocols, and systems. For example, network 140 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

As illustrated in FIG. 1, users may interact with organization 145 via different channels using various points of interaction. Organization 145 may be a membership organization, and the users may be members or potential members of the membership organization. Organization 145 may be a financial institution, or any kind of entity providing any type of service. Organization 145 may be communicably coupled with third party 170. Third party 170 is any organization or source of information external to organization 145 that provides organization 145 with information that may be used in determining an activity trust threshold. For example, information provided by third party 170 may include the identity of IP addresses known to be fraudulent, known mal-ware on systems or networks, etc. Third party 170 may provide information that is specific to a user. For example, a third party may provide information that a credit card belonging to the user has recently been compromised. The information may be stored in security and fraud indicator database 155. Organization 145 may include various computing systems, rules engine 160, user behavior database 150, security and fraud indicator database 155, and user database 165. Rules engine 160 uses information from various databases and third party 170, including information related to the risk of the activity and information acquired in connection with the channel, applies rules relating to the risk of the activity and the information in connection with the channel to determine an activity trust threshold, acquires and uses identifying information to establish an identity trust score for the user, and determines whether the user is permitted to engage in a particular activity. Additionally, the rules engine dynamically generates the identity trust score as information becomes available. The identity trust score may be upgraded or degraded depending upon the identifying information.

Rules engine 160 can be communicably coupled to one or more databases such as user behavior database 150, security and fraud indicator database 155, and user database 165, and may receive information from third party 170. These databases and external sources include information that can be utilized by rules engine 160. For example, user behavior database 150 includes transaction information relating to past transactions the user has engaged in such as the time of day transactions were made, the amount and destination of the transfer, the channel and/or point of interaction used, activities and times associated with those activities (time spent making the transaction), etc. User behavior database 150 may also include information relating to the user's account, such as how many logon attempts have been made, the number of failed logon attempts, the number of successful logon attempts, where the attempts originated from, when and where and from what machine the user has changed passwords, registered devices, and so on. User behavior database 150 may also include information relating to the user's common purchasing habits. User database 165 stores information about users, including employment information, account balances, credit ratings, home ownership information, annual salary, length of membership, and/or other information. User database 165 may store security preferences or instructions that the user has expressed, such as if a requested transaction is over $100 to ask the requestor for a one time password sent to an email address. Security and fraud indicator database 155 stores information relating to information security events, physical security events, cyber intelligence, IP addresses that organization 145 has previously received attacks from, addresses of known fraudsters, known mal-ware on systems or networks, risk scores associated with IP addresses or networks, etc. This information may also be provided or supplemented by third party 170. These events may be related to a particular user, or the events may relate to all users. Thus, this information may impact the activity trust threshold required for an activity globally, or the information may relate to one particular user. In some embodiments, these databases may be integrated into one database. A computer system associated with the organization or authorized third parties may be able to access these databases for account information, user information, security information, and other stored information. In addition, third parties may provide information relating to the user such as the location of the user, a credit score of the user, or any other security information. The rules engine may include many sub-engines that combine scores ultimately.

Figure 2:
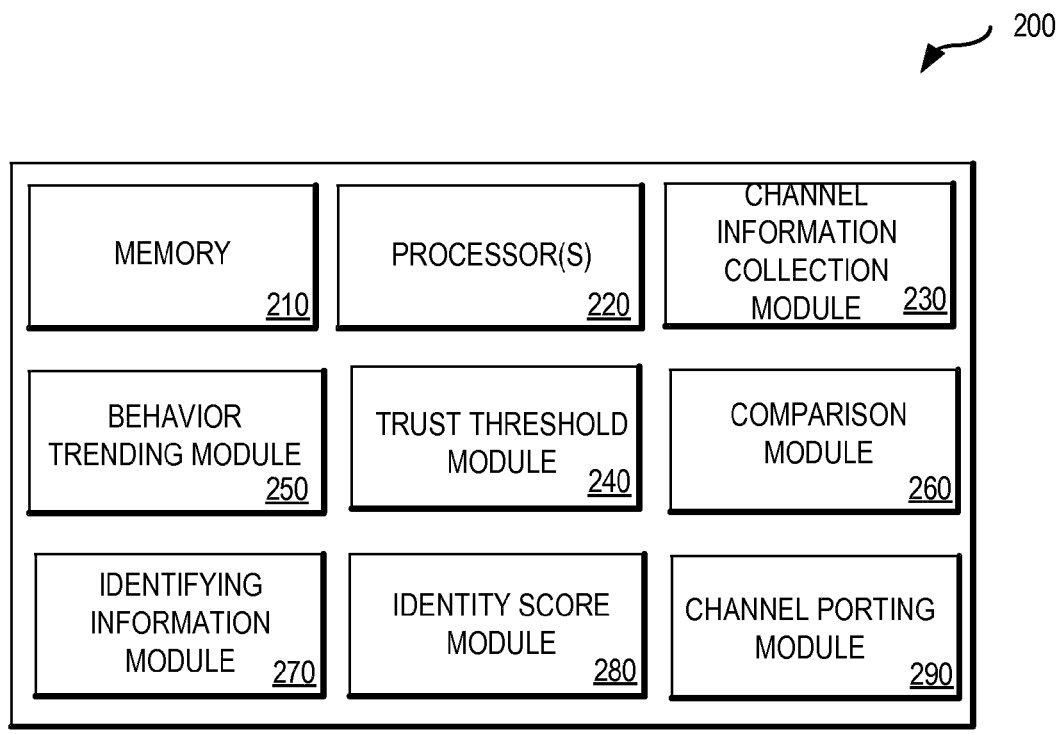
FIG. 2 is a block diagram illustrating exemplary components that can be included in an identity authentication system in accordance with various embodiments of the present invention.

FIG. 2 is a block diagram illustrating exemplary components that can be included in an identity authentication system in accordance with various embodiments of the present invention. According to the embodiments shown in FIG. 2, the authentication system 200 can include memory 210, one or more processors 220, channel information collection module 230, behavior trending module 250, activity trust threshold module 240, comparison module 260, identifying information module 270, identity trust score module 280, and channel porting module 290. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module.

For example, in one embodiment, the functionality associated with channel information collection module 230 and identifying information module 270 can be incorporated into a single information collection and analysis module. As another example, in one embodiment, the identity trust score module 280 can be separated into a channel rules module for determining the channel-appropriate authentication rules, a security preferences module for determining the security preferences of the user, and an identity trust score updating module to continuously update the identity trust score as identifying information becomes available. Moreover, the output of these modules can be a channel-specific identity trust score that is updated constantly to authenticate the user according to security preferences.

Memory 210 can be any device, mechanism, or populated data structure used for storing information. In accordance with some embodiments of the present invention, memory 210 can encompass any type of, but is not limited to, volatile memory, nonvolatile memory and dynamic memory. For example, memory 210 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 220. For example, memory 210 could be used in one or more embodiments to house all or some of the instructions needed to execute the functionality of channel information collection module 230, behavior trending module 250, activity trust threshold module 240, comparison module 260, identifying information module 270, identity trust score module 280, and channel porting module 290.

Channel information collection module 230 is configured to engage in an initial contact with a user via a channel, and in doing so, it is further configured to receive, collect and/or acquire information in connection with the channel, including location information (e.g., region, city, ISO country code, global positioning system information), machine or device identification, internet protocol address, the type of network (e.g., cable, dial-up, digital subscriber line, fiber-optic internet, mobile), language, and internet service provider. For example, the information collection module 230 may detect that the user is using a particular device that is registered with the organization. Some information acquired by the channel information collection module may be used in determining an activity trust threshold. For example, if a user is determined to be located in France, more identifying information may be required from the user as compared to a user determined to be located in the United States, even if the users are requesting to engage in the same activity.

Behavior trending module 250 compiles, mines, and/or models data related to historic user behavior. The historic user information is compared to the user's activity to provide additional identifying information. The identifying information may be used in determining an identity trust score for the user, and may be collected continuously during the session. For example, behavior trending module 250 may compile information related to logon attempts for the user including the number of successful and unsuccessful logon attempts, the number of connection events, the time period the attempts were made in, historical user channel information, the type of activities the user has requested, the time of day the user requests the activity or similar activities, the nature of the activities, etc. This identifying information is used in determining an identity trust score for the user requesting to participate in the activity. The user's identity trust score may dynamically change during a session depending on the user's activities as analyzed by the behavior trending module 250. For example, a user's identity trust score may initially be high enough to view an account balance, check charges on a debit card. However, to transfer money from one account to another account may require additional authentication to increase the user's identity trust score. The user's identity trust score may increase if the user follows the same behavior on the website as the user typically does. For example, assume the user typically logs in and spends five to ten seconds on the summary page, followed by checking credit card charges for a few minutes, and then reviews several stock prices. If the user does some or all of the actions prior to or while requesting the transfer, the identity trust score would have increased since the user's initial logon. Thus, a user requesting to engage in a generally high risk activity may engage in the activity if the user has a history of engaging in the activity in a manner consistent with past behavior. This use of past user behavior may also decrease the identity trust score. For example, if the user's browsing behavior is incongruent with past browsing behavior, then the user's identity trust score may be lowered. Thus, the behavior trending module may be used in determining the user's identity trust score based on any number of factors including the number of logon attempts and historic user behavior.

Activity trust threshold module 240 is configured to determine an activity trust threshold for the activity. The activity trust threshold sets a minimum identity trust score required for a user to engage in the activity. Activity trust threshold module 240 accesses information collected and/or processed by channel information collection module 230 and behavior trending module 250, and other general information relating to the risk of the activity. In some embodiments, the activity trust threshold module 240 may use information provided by third parties including information that is specific to the user and/or information that may be applied globally. The information is used in determining the activity trust threshold. In some embodiments, determining the activity trust threshold includes generating the activity trust threshold based on rules relating to a risk of the activity and information collected in connection with the channel. A risk of the activity may be determined by the type of the activity, perceived system threats, regulations, transaction amount, time of the activity, destination of funds, and/or any other factors. Other factors or information in connection with the channel may include channel risk, ground speed (miles per hour to travel between the logon location and the previous logon location), the number of days since the last address change, number of alerts on the user, etc.

In some embodiments, the activity trust threshold module may include a scoring system in which the value of each factor is given a score. In some embodiments each factor is weighted according to its significance. The scores may be combined in any desired manner to determine an activity trust threshold. Any number of factors may be used to determine an activity trust threshold for any user, engaging in any activity via any channel, providing a flexible system. Additionally, in some embodiments, various factors described as used to determine the activity trust threshold may be used instead in determining the identity trust score, and vice versa.

Identifying information module 270 is configured to acquire identifying information associated with the user. Identifying information collected by the identifying information module 270, in combination with information supplied by the behavior trending module 250 is used in the identity trust score module 280 to determine an identity trust score. Examples of identifying information include a password, username, biometric data, device identification, phone number, token, one-time password or grid card. In some embodiments, identifying information module 270 collects identifying information according to channel. For example, identifying information if the channel is an internet portal may include device identification, username and password personal identification number, and a token, whereas identifying information if the channel is a voice communication may include ANI, voice biometrics, and a token. A set of channel rules may determine the order that the information is collected, if at all. Some identifying information is collected automatically and continuously. For example, if the channel is voice communications, the identifying information module 270 may analyze the voice as the user speaks, thus providing identifying information to the identity trust score module 280. In some embodiments, the identifying information module 270 requests the user to provide additional identifying information. The request may be made if the identifying information is not satisfactory for the user to engage in the activity because the activity trust threshold requires more identifying information. Or the request for additional identification may be made consistent with security preferences expressed by the user. For example, the user may have requested that any transaction over a certain amount requires the user to enter a PIN. Or the user may have indicated a rule disallowing wire transfers or transfers to certain countries.

The identity trust score module 280 is configured to determine an identity trust score for the user based on information acquired by the identifying information module 270 and the behavior trending module 250. In some embodiments, the identity trust score module 280 performs channel-appropriate authentication by determining an identity trust score for the user based on the identifying information acquired from the identifying information module 270. Thus, the identity trust score may be a number or a level of information that corresponds with the activity trust threshold. If the activity trust threshold level is low (indicating that the risk is low or trust is high), less identifying information is necessary for the user to engage in the activity. In some embodiments, each channel is governed by channel-specific rules. For example, on a voice telephone call, determining only the phone number may result in an insufficient or low identity trust score. However, if the user's voice is authenticated, the user will then automatically be authenticated to a much higher level, resulting in a higher identity trust score. In another example, a user attempting to fill out a loan application online scores a certain identity trust score simply by using a machine that is recognized. However, the user will score a much higher identity trust score if the user provides a username/password combination. Thus, some factors collected in connection with the channel as well as historical user behavior are integrated together by some weighted formula to dynamically generate an identity trust score.

Once the identity trust score is determined by the identity trust score module 280, the comparison module 260 compares the identity trust score with the activity trust threshold. If the comparison module determines that the identity trust score meets or exceeds the activity trust threshold, then the user will be permitted to engage in the activity. If the comparison module 260 determines that the identity trust score is lower than the activity trust threshold, then the user is either rejected from engaging in the activity or the user may be asked to provide additional identifying information to raise the identity trust score. If additional identifying information becomes available (e.g., the identifying information module requests more information or collects it automatically), the identity trust score is re-calculated with the new information and the revised identity trust score is compared with the activity trust threshold. In some embodiments the identity trust score is dynamically generated, sometimes by information provided from the behavior trending module, and, thus, the identity trust score is being constantly updated without additional requests from the user. In some embodiments, the user has exhausted all methods of authentication in that channel but has been unsuccessful in raising the identity trust score to the necessary activity trust threshold level. Thus, the user will be rejected from engaging in the activity. In some examples, the activity trust threshold is determined to be too high and the user will be rejected without being asked for additional identifying information. For example, if the information collection module determines that the user is accessing an account from certain countries or regions, the request may simply be rejected because the activity trust threshold determined by the activity trust threshold module is simply unattainable.

The following is an example of how the dynamic risk engine may be used. A user wishes to engage in wiring money from an account in the United States to an account in China. The channel is an internet portal. Before the user has logged in or requested to engage in the wire transfer, the channel information collection module has collected some information such as location, internet service providers, network, and provided the information to the activity trust threshold module. The information collection module has determined that the user is located in China and that the internet service provider is AOL. Each of the values of these factors is given a predetermined score perhaps determined by industry standards. For example, a location of China may be given a certain score indicating that the trust level for this user is not high. The internet service provider may be one that is trusted, indicating a high level of trust. However, the location information may be more significant in determining the activity trust threshold and may therefore have a greater impact on the overall activity trust threshold. Thus, some factors in connection with the channel as well as the factors related to a risk of the activity are then integrated together by some weighted formula to determine an activity trust threshold for this user to engage in this activity. Thus, as illustrated in the example, the activity trust threshold is determined by various rules related to the risk of the activity and information in connection with the channel. Next, an identity trust score is determined. As mentioned, information in connection with the channel including the device identification has been collected. Next an initial identity trust score is determined. It is determined that the device is has been registered in the system or that the user has used in the past. Additionally, the user provided a correct username and password. An initial identity trust score is determined based on this identifying information. The behavior trending module supplies information that the logon attempt was successful on the first attempt, that the user is currently deployed to China, and that every Saturday, at a similar time, the user wires money from an account in the United States to an account in China, consistent with the user's actions today. Additionally, when the user logged in, the user checked a credit card balance prior to request the transfer, as the user typically does. Thus, the identity trust score is raised because the user is acting in accordance with historical user behavior.

As described, the identity trust score is then compared to the activity trust threshold to determine whether additional identifying information is necessary. If so, the identity trust score is regenerated as the information becomes available.

In some embodiments, authentication system 200 includes a channel porting module 290 configured to transfer a user on one channel to a second channel that is different from the first channel, during a session. The channel porting module 290 allows the session to seamlessly be transferred to a different channel. Thus, an identity trust score and activity trust threshold in connection with the second channel may be determined and compared. If enough identifying information is available (the identity trust score meets or exceeds the activity trust threshold), the session will be continued on the second channel. Thus, the information collected in connection with the first channel may be used to authenticate the user on a second channel. In some embodiments, the user may not be required to provide any additional identifying information for the session to be continued on the second channel.

Figure 3:
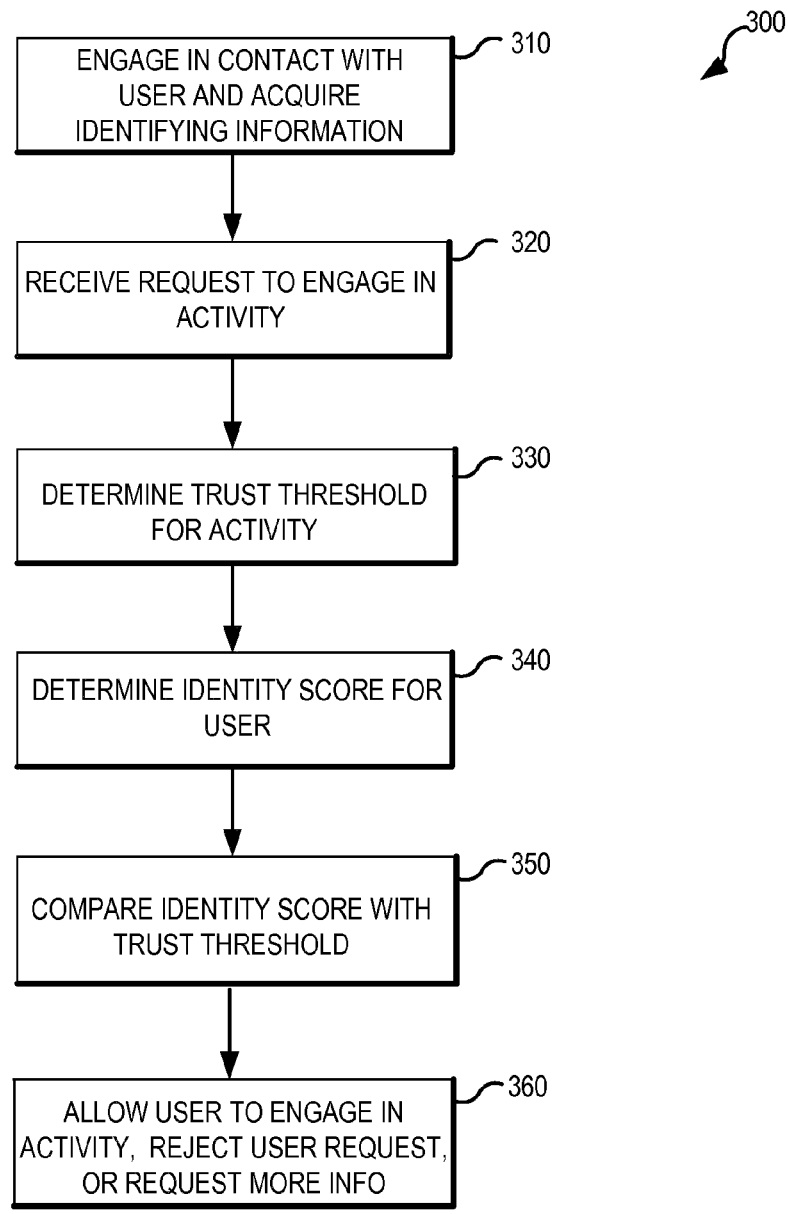
FIG. 3 is a flow chart illustrating a set of exemplary operations for determining whether to allow a user to engage in a restricted activity in accordance with some embodiments of the present invention.

FIG. 3 is a flow chart illustrating a set of exemplary operations for determining whether to allow a user to engage in a restricted activity in accordance with some embodiments of the present invention. In block 310, a user engages in a contact via a channel. Also in this block, identifying information relating to the user is acquired. The channel may be a mobile application, an internet portal, voice communication, instant messaging system, or an in-person visit to a brick and mortar building. Thus, a number of devices or no device may be used in making the contact. The user may or may not have an account with the organization. In an example, a contact may include a visit to a website, and identifying information may include device identification.

In block 320, a request is received for the user to engage in an activity. The activity may be to view a particular webpage of the organization, transfer funds, fill out a mortgage application, browse interest rates, compare insurance rates, purchase insurance, deposit a check, for example.

In block 330, an activity trust threshold is determined for the requested activity. In some embodiments, determining the activity trust threshold includes generating the activity trust threshold based on rules relating to a risk of the activity and information collected in connection with the channel. Some or all of the information may be assigned scores and totaled to generate an activity trust threshold. In some embodiments the information is weighted depending on the significance of the information. As described above, the activity trust threshold sets a minimum identity trust score (level of identifying information) that must be acquired for the user to engage in the activity.

In block 340, an identity trust score is determined for the user. The identity trust score is determined based on the identifying information acquired. In some embodiments, the identifying information is based at least in part on information in connection with the channel. In some embodiments, the identifying information is channel-specific. Identifying information may include information such as a username, a password, biometric data, a device identification, an automatic number identification, a token, a one time password or a grid card code, for example. Identifying information may also include information collected or compiled in connection with the user's historic behavior. For example, if the user acts in accordance with typical behaviors, the user's identity trust score may be increased. Or, if the user acts inconsistently with past behaviors, the user's identity trust score may be decreased from the initial score.

In block 350, the identity trust score is compared with the activity trust threshold. Next in block 360, based on the comparison, the user is allowed to engage in the activity, the user's request to engage in the activity is rejected, or additional identifying information is requested from the user or collected automatically.

Figure 4:
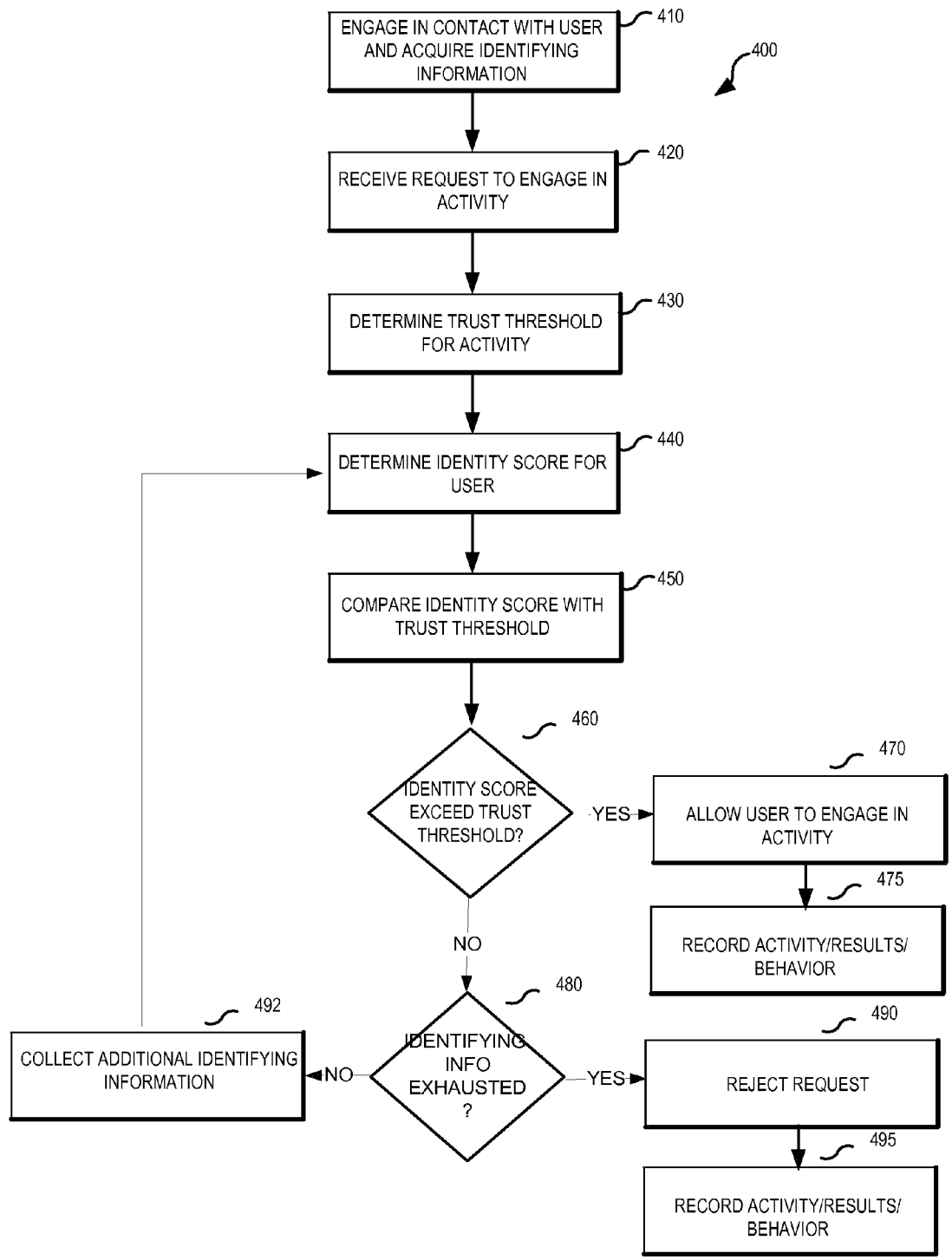
FIG. 4 is a flow chart illustrating a set of exemplary operations for determining whether to allow a user to engage in a restricted activity in accordance with some embodiments of the present invention.

FIG. 4 is a flow chart illustrating a set of exemplary operations for determining whether to allow a user to engage in a restricted activity in accordance with some embodiments of the present invention. Blocks 410-450 represent the same steps as discussed in blocks 310-350. At block 460, a determination is made whether the identity trust score meets or exceeds the activity trust threshold. If the identity trust score meets or exceeds the activity trust threshold, in block 470, the user is permitted to engage in the activity. In block 475, information related to the activity (e.g., type and nature of activity, channel), results, and behavior (e.g., number of attempted logons, time of day) is recorded for future use. Alternatively, if the identity trust score does not meet or exceed the activity trust threshold, block 480 determines whether the identifying information acquired in connection with the channel is exhausted, and whether other identifying information such as past user behavior data is available. If all identifying information has been exhausted, then in block 490, the user is rejected from engaging in the activity. In block 495, information related to the activity, results, and behavior is recorded. In some examples, the information may include associating a fraud alert with the user. If additional identifying information may be acquired, then in block 492, additional identifying information is collected or acquired. The collecting operation may be performed automatically or the user may be requested to provide additional identifying information. For example, while on the phone, the user's voice may be authenticated and thus the identity trust score is revised. Or the user may be asked to provide a one time password. Or the user may have acted in accordance with previous behaviors, thus raising the identity trust score. After the additional information is collected, the operation returns to block 440 to determine a revised identity trust score for the user, and to block 450 for the comparison operation. The process continues until the user is rejected or allowed to engage in the activity.

In some embodiments, situations exist in which no amount of additional identifying information will permit the user to engage in the activity. For example, if the user's location is determined to be in a country that raises the activity trust threshold to an extremely high level (e.g., requiring biometric data such as hair samples to reach an acceptable identity trust score), no amount of identifying information in that channel may overcome the activity trust threshold and thus the user is not permitted to engage in the activity. In another example, security preferences provided by the user may restrict activity. The security preferences may include rules pertaining to what activity is allowed or rules that restrict when activities can take place.

Figure 5:
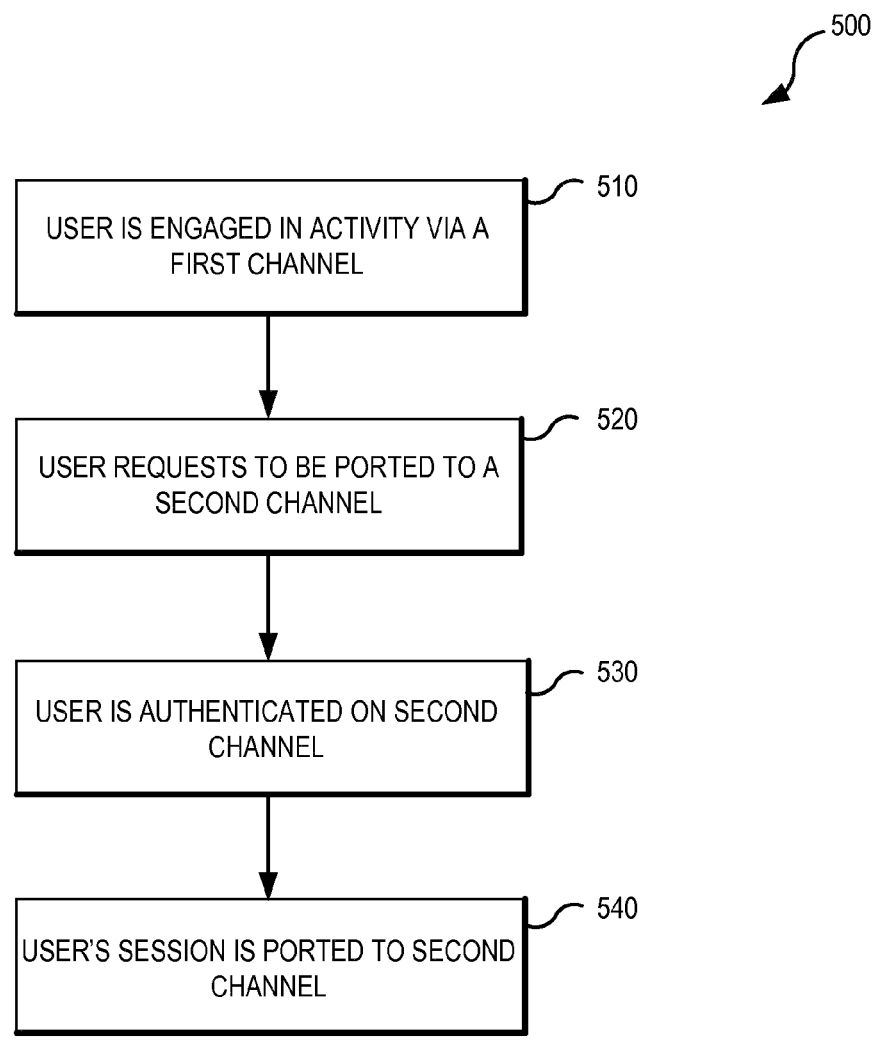
FIG. 5 is a flow chart illustrating a set of exemplary operations for a porting feature in accordance with some embodiments of the present invention.

FIG. 5 is a flow chart illustrating a set of exemplary operations for a porting feature in accordance with some embodiments of the present invention. In block 510, a user is engaged in an activity via a first channel. In block 520, the user requests that the session be ported to a second channel that is different than the first channel. In block 530, the user is authenticated on the second channel. In block 540, the user's session is ported to the second channel and the user can continue to engage in the activity. For example, the user is attempting to fill out a mortgage application using a mobile phone via a mobile phone application. The user may choose to complete the application during the same session but chooses to continue filling out the application on a personal computer. The activity trust threshold for this activity is determined to be low, and the user is authenticated simply by the device identification. Thus, the user can complete the application during the same session.

Exemplary Computer System Overview

Figure 6:
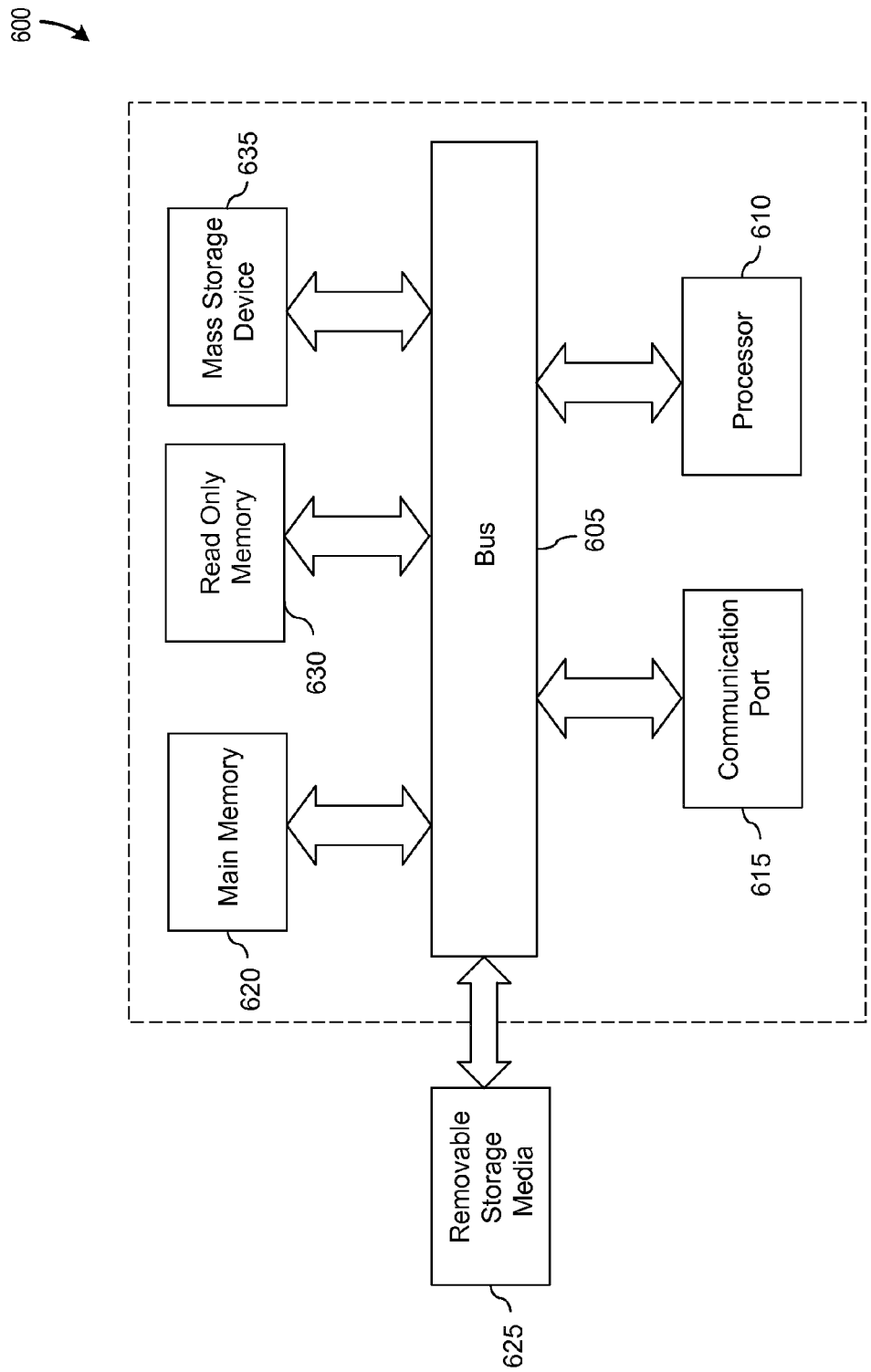
FIG. 6 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present invention may be utilized. According to the present example, the computer system includes a bus 605, at least one processor 610, at least one communication port 615, a main memory 620, a removable storage media 625, a read only memory 630, and a mass storage 635.

Processor(s) 610 can be any known processor, such as, but not limited to, an Intel® Itanium® or Itanium 2® processor(s), or AMD® Opteron® or Athlon MP® processor(s), or Motorola® lines of processors. Communication port(s) 615 can be any of an RS-232 port for use with a modem based dialup connection, a 10/100 Ethernet port, or a Gigabit port using copper or fiber. Communication port(s) 615 may be chosen depending on a network such a Local Area Network (LAN), Wide Area Network (WAN), or any network to which the computer system 600 connects.

Main memory 620 can be Random Access Memory (RAM), or any other dynamic storage device(s) commonly known in the art. Read only memory 630 can be any static storage device(s) such as Programmable Read Only Memory (PROM) chips for storing static information such as instructions for processor 610.

Mass storage 635 can be used to store information and instructions. For example, hard disks such as the Adaptec® family of SCSI drives, an optical disc, an array of disks such as RAID, such as the Adaptec family of RAID drives, or any other mass storage devices may be used.

Bus 605 communicatively couples processor(s) 610 with the other memory, storage and communication blocks. Bus 605 can be a PCI /PCI-X or SCSI based system bus depending on the storage devices used.

Removable storage media 625 can be any kind of external hard-drives, floppy drives, (OMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Terminology

Brief definitions of terms, abbreviations, and phrases used throughout this application are given below.

The term "user" may include a person and/or any endpoint computing device.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present invention provides novel systems, methods and arrangements for systems and methods to determine whether a user may perform a restricted activity. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
   interacting, via a medium for information exchange, with a device associated with a user;
   receiving or initiating a request to engage in an activity during the interaction;
   determining, by a processor, an activity trust threshold for the activity;
   determining, by the processor an initial identity trust score for the user based at least in part on identifying information collected during the interaction, wherein the initial identity trust score is an identity trust score at a time the activity is requested;
   comparing the initial identity trust score with the activity trust threshold to determine whether to allow the user to engage in the activity;
   based on the comparison of the initial identity trust score with the activity trust threshold, performing one of:
      allowing the user to engage in the activity during a session, the session being a continuous dialogue,
      collecting additional identifying information until a revised identity trust score meets or exceeds the activity trust threshold, or
      rejecting the request to engage in the activity; and
   wherein when the user is allowed to engage in the activity:
      receiving a request to continue the session via a second medium for information exchange,
      dynamically updating the identity trust score with information collected during the session, and
      continuing the session via the second medium for information exchange when the updated identity trust score meets or exceeds the activity trust threshold in connection with the second medium for information exchange.

2. The method of claim of 1, wherein the initial identity trust score is based at least in part on the medium for information exchange.

3. The method of claim of 1, wherein the activity trust threshold is determined based on rules relating to a risk of the activity, wherein the risk of the activity is determined based at least in part on security preferences.

4. The method of claim 3, wherein the security preferences are defined by an organization.

5. The method of claim 1, wherein the activity trust threshold is determined based on rules relating to a risk of the activity, and wherein the risk of the activity is determined by at least one of: type of the activity, perceived threats, regulations, transaction amount, or destination of funds.

6. The method of claim 1, wherein the identifying information is at least one of: username, password, biometric data, device identification, automatic number identification, token, one time password, or grid card code.

7. The method of claim 1, wherein receiving or initiating the request to engage in the activity comprises receiving or initiating the request to perform the activity over the medium for information exchange.

8. The method of claim 1, wherein the medium for exchange is an internet portal, a mobile application, an instant messaging system, or voice communication, wherein the identifying information is acquired based at least in part on the medium for information exchange.

9. The method of claim 1, wherein the identifying information comprises historical user behavior, wherein historical user behavior comprises information related to logon attempts and information related to historical user activities.

10. The method of claim 1, wherein the identifying information is information in connection with the medium for information exchange, wherein the information in connection with the medium for exchange comprises at least one of: location information, device identification, past channel usage, language, network, or internet service provider.

11. The method of claim 1, wherein the identifying information is at least one of: information known to the user, a physical attribute of the user, or information identifying the device.

12. The method of claim 1, wherein the identifying information used to allow the user to engage in the activity via the first medium for information exchange is used to allow the user to engage in the activity via the second medium for information exchange.

13. The method of claim 12, wherein the second medium for information exchange is a different type of medium for information exchange than the initial medium for information exchange.

14. The method of claim 1, wherein rejecting the request to engage in the activity comprises associating a fraud alert with the user.

15. The method of claim 1, wherein allowing the user to engage in the activity comprises allowing the user to engage in the activity when the initial identity trust score meets or exceeds the activity trust threshold.

16. The method of claim 1, wherein collecting additional identifying information until the revised identity trust score meets or exceeds the activity trust threshold comprises collecting the additional identifying information until the revised identity trust score meets or exceeds the activity trust threshold when the initial identity trust score is below the activity trust threshold.

17. The method of claim 1, wherein the rejecting the request to engage in the activity comprises rejecting the request to engage in the activity when the additional identifying information cannot raise the initial identity trust score to or above the activity trust threshold.

18. A non-transitory, computer-readable storage medium containing a set of instructions which, when executed by one or more processors, cause the one or more processors to:
  interact, via a medium for information exchange, with a device associated with a user;
  receive or initiate a request to engage in an activity during the interaction;
  determine an activity trust threshold for the activity;
  determine an initial identity trust score for the user based at least in part on identifying information collected during the interaction, wherein the initial identity trust score is an identity trust score at a time the activity is requested;
  compare the initial identity trust score with the activity trust threshold to determine whether to allow the user to engage in the activity;
  based on the comparison of the initial identity trust score with the activity trust threshold, perform one of:
    allow the user to engage in the activity during a session, the session being a continuous dialogue,
    collect additional identifying information until a revised identity trust score meets or exceeds the activity trust threshold, or
    reject the request to engage in the activity; and
  wherein when the user is allowed to engage in the activity:
    receive a request to continue the session via a second medium for information exchange,
    dynamically update the identity trust score with information collected during the session, and
    continue the session via the second medium for information exchange when the updated identity trust score meets or exceeds the activity trust threshold in connection with the second medium for information exchange.

19. The non-transitory, computer-readable storage medium of claim 18, wherein the user is allowed to engage in the activity when the initial identity trust score meets or exceeds the activity trust threshold, wherein the additional identifying information is collected when the initial identity trust score is below the activity trust threshold, wherein the request to engage in the activity is rejected when the additional identifying information cannot raise the initial identity trust score to or above the activity trust threshold.

20. A system comprising:
  a memory; and
  a processor in communication with the memory, the processor operable to execute software modules, the software modules comprising:
    a channel information collection module operable to:
      interact, via a medium for information exchange, with a device associated with a user;
      receive or initiate a request to engage in an activity during the interaction;
    an activity trust threshold module operable to:
      determine an activity trust threshold for the activity;
      determine an initial identity trust score for the user based at least in part on identifying information collected during the interaction, wherein the initial identity trust score is an identity trust score at a time the activity is requested;

a comparison module operable to:
    compare the initial identity trust score with the activity trust threshold to determine whether to allow the user to engage in the activity;
    based on the comparison of the initial identity trust score with the activity trust threshold, perform one of:
        allow the user to engage in the activity during a session, the session being a continuous dialogue,
        collect additional identifying information until a revised identity trust score meets or exceeds the activity trust threshold, or
        reject the request to engage in the activity; and
    wherein when the user is allowed to engage in the activity:
        receive a request to continue the session via a second medium for information exchange,
        dynamically update the identity trust score with information collected during the session, and
        continue the session via the second medium for information exchange when the updated identity trust score meets or exceeds the activity trust threshold in connection with the second medium for information exchange.

* * * * *